United States Patent [19]

Fleenor

[11] 4,049,136
[45] Sept. 20, 1977

[54] PRIME MOVER AND BOX CAR COMBINATION FOR HANDLING CARGO

[76] Inventor: Warren O. Fleenor, 8250 W. Bergen Road, LeRoy, N.Y. 14482

[21] Appl. No.: 643,086

[22] Filed: Dec. 22, 1975

[51] Int. Cl.² .............................................. B60P 1/44
[52] U.S. Cl. ................................ 214/38 R; 105/1 A; 214/75 G
[58] Field of Search ................ 214/38 R, 44 A, 75 R, 214/75 G, 75 H, 75 T, 83.26; 104/1 R; 105/1 R, 1 A, 2 B

[56] References Cited

U.S. PATENT DOCUMENTS

| 1,263,170 | 4/1918 | Webb | 214/44 A X |
| 3,794,193 | 2/1974 | Fleenor | 214/75 G |

Primary Examiner—Robert G. Sheridan

[57] ABSTRACT

A prime mover and box car combination for loading and unloading cargo in which the prime mover and box car are provided with aligned support rails. A cargo handling mechanism is slidably mounted on the support rails for movement between an extended operating position on the prime mover and a cargo handling position on the box car. The cargo handling mechanism is further movable on the prime mover between its extended operating position and a normal retracted storage position.

12 Claims, 6 Drawing Figures

PRIME MOVER AND BOX CAR COMBINATION FOR HANDLING CARGO

BACKGROUND OF THE INVENTION

1. Field of the Invention

This invention relates generally to cargo handling mechanisms, and more specifically to a prime mover and box car combination for loading and unloading cargo.

2. Description of the Prior Art

It is known in the prior art to provide an enclosure such as a box car with a slidably mounted cargo handling mechanism. Exemplary patents disclosing such a cargo handling mechanism are U.S. Pat. Nos. 3,368,704, 3,794,193 and 3,892,088. In such patents, a cargo handling mechanism is either mounted on each transportable box car, or is provided at each of the loading or unloading stations where it is mounted by a crane or the like on each car for loading and/or unloading the car. Following the loading and/or unloading operation, the cargo handling mechanism is removed from the car. A disadvantage of providing a cargo handling mechanism for each car is that a large number of such mechanisms are required resulting in considerable expense. A disadvantage of providing a cargo handling mechanism at each station is that a crane or the like must be provided at each station for mounting and unmounting the mechanisms from the box cars. Applicant's invention is believed to obviate these and other disadvantages of the prior art. With the prime mover and box car combination of this invention it is possible to load and/or unload cargo in small or large quantities at any station along a way such as a highway or railway. This prime mover and box car combination is particularly useful for short mileage shipping, particularly between stations established in each community along the railway as it was years ago. This prime mover with one or more box cars would be capable of serving each individual no matter how small a shipment they had as well as those who would ship in large quantities. This would permit picking up and delivering cargo at any location along the right of way in a minimum of time and effort. Although the prime mover is illustrated as a locomotive in the preferred embodiment, such prime mover could take any other known form such as a tractor for use in a tractor-trailer combination.

SUMMARY OF THE INVENTION

In accordance with a preferred embodiment of the invention, a prime mover and box car combination is disclosed to facilitate rapid delivery of cargo between cargo handling stations, and to provide a cargo handling mechanism for loading and/or unloading cargo at each of the stations. The prime mover and box car combination comprises a prime mover having an engine section and a storage car section having a cargo handling mechanism mounted thereon. The cargo handling mechanism is movable on the prime mover between a normal retracted storage position in which the prime mover, cargo handling mechanism and box car are movable as a unit, and an extended operating position in which the prime mover is disabled and the cargo handling mechanism is slidably movable from the prime mover onto the box car to a cargo loading and/or unloading position. The disablement of the prime mover is achieved, for example, by coupling means between the cargo handling mechanism and the prime mover for setting the brakes, turning off the prime mover engine and/or locking the transmission in a neutral position.

The invention and its advantages will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 3 is a section view similar to FIG. 2 showing the cargo handling mechanism in its extended operating position;

DESCRIPTION OF THE PREFERRED EMBODIMENTS

Figure 1:
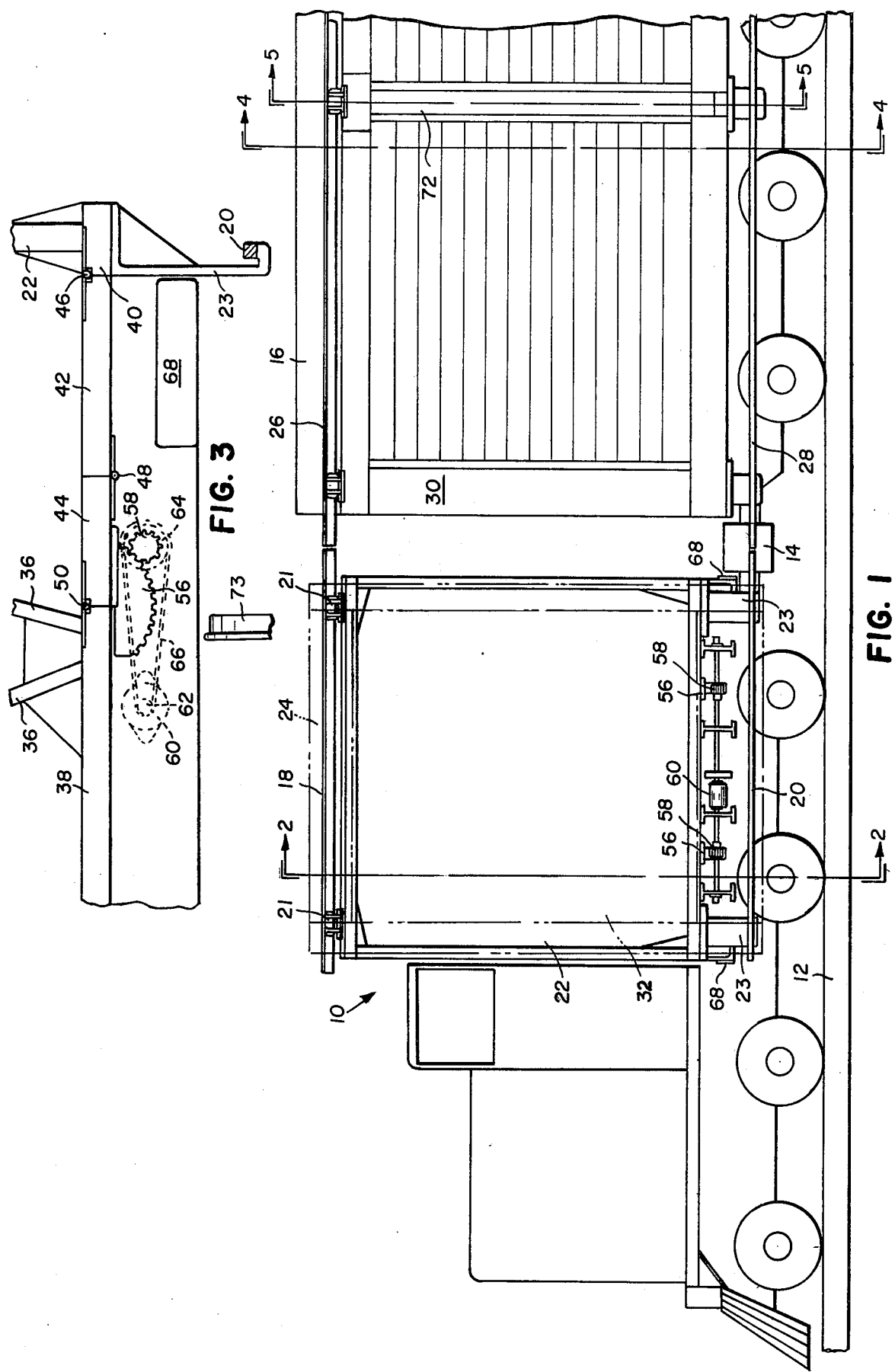
FIG. 1 is a side elevational view illustrating a preferred embodiment of the prime mover and box car combination of this invention.

With reference to FIG. 1 of the drawings, a prime mover 10 comprising a diesel or steam engine front section having a rear storage car section is shown mounted on rails 12 and coupled by known coupling means 14 to a box car 16. Although the rear storage car section is shown integral with the engine front section, it could be coupled thereto by other known means to form prime mover 10. The storage car section of prime mover 10 has a pair of upper and lower rails 18, 20 respectively secured to a side wall 22 thereof (FIG. 2) for slidably supporting a cargo handling mechanism 24 (illustrated in phantom in FIG. 1) of the type disclosed in U.S. Pat. Nos. 3,794,193 and 3,892,088. The box car 16 is also provided with upper and lower rails 26, 28 respectively secured to the side wall 30 thereof in alignment with corresponding rails 18, 20, and cooperating therewith for slidably supporting the cargo handling mechanism 24 for movement between the prime mover 10 and box car 16. The cargo handling mechanism comprises a door 32, described fully in the aforementioned patents, that is vertically movable for aligning the lower end of the door with the cargo-supporting surface in box car 16. The door 32 is also pivotally movable between a normally closed position in which it blocks entry to the box car and assumes a compact position for transport and handling of the mechanism, and an open position in which the door forms a platform over which the cargo may be loaded into or unloaded from the box car.

Figure 2:
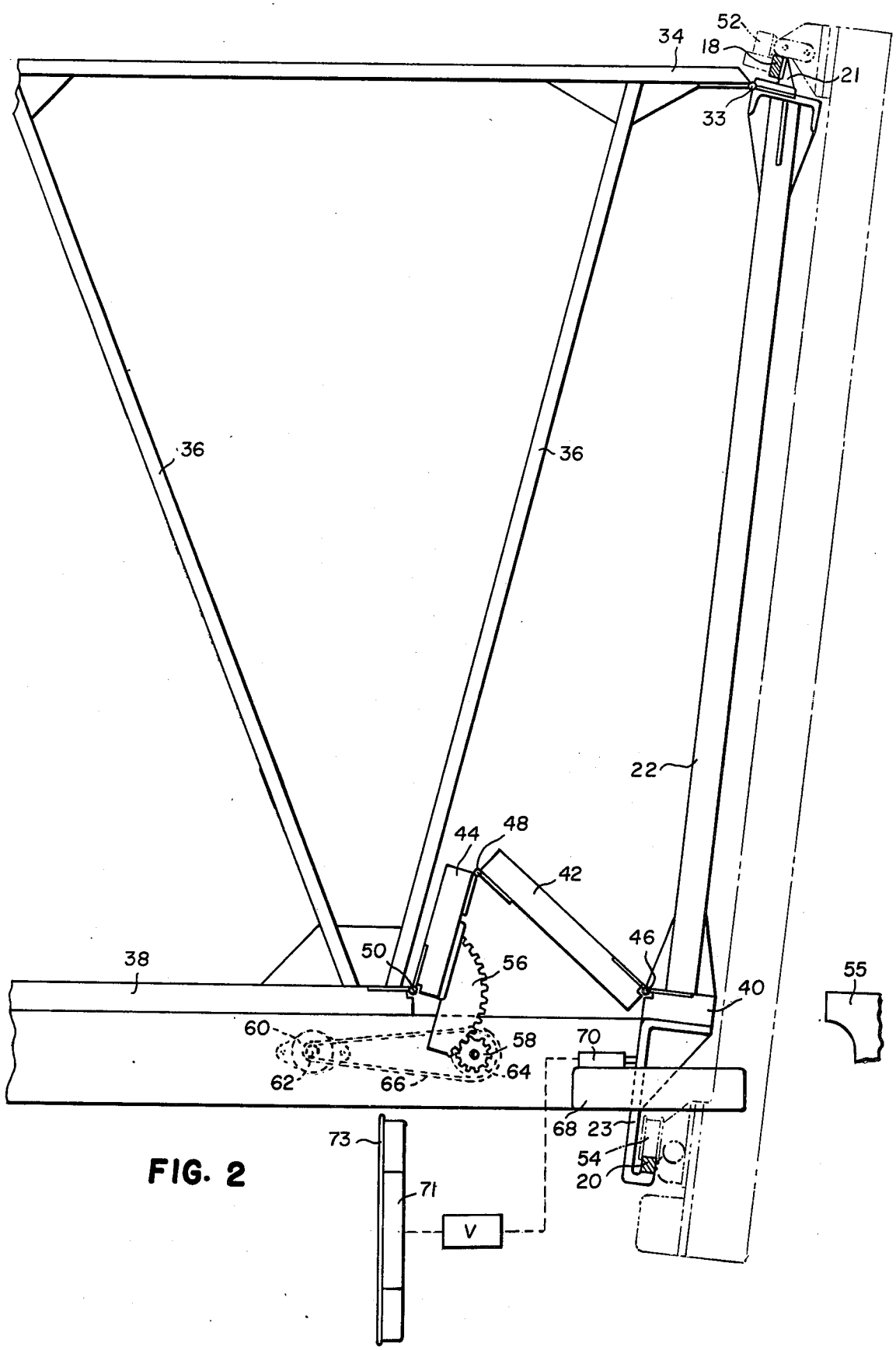
FIG. 2 is a section view taken substantially along line 2—2 of FIG. 1 with the cargo handling mechanism on the prime mover in a retracted storage position.

With reference to FIG. 2, the upper end of side wall 22 is shown hinged by one or more hinges 33 to the edge of roof 34 or prime mover 10. The roof, in turn, is supported by beams 36 interconnecting roof 34 and main floor 38. The lower end of side wall 22 has a floor member 40 rigidly secured thereto which is hingedly connected by floor members 42, 44 and hinges 46, 48, 50 to one edge of main floor 38. By virtue of hinged floor members 42, 44, side wall 22 is movable on the prime mover between a retracted storage position as seen in FIG. 2 to an extended operating position as see in FIG.

3. The aforementioned rails 18, 20 are secured by any suitable brackets 21, 23 respectively to the upper and lower ends respectively of side wall 22 for slidably supporting the cargo handling mechanism 24 with rollers 52, 54 in slidable engagement with rails 18, 20 respectively. In this retracted storage position of side wall 22 and cargo handling mechanism 24, the cargo handling mechanism will clear fixed platform edges 55 of subways, elevated railroads, suburban passenger platforms or any other stationary structure adjacent to railroad right of ways. The side wall 22 and cargo handling mechanism 24 is movable to the retracted storage position by a gear quadrant 56 whose axis is the hinge pin of hinge 50. Gear quadrant 56 is rigidly secured to floor member 44 and rotatable about hinge pin 50 by a meshing spur gear 58 driven by any suitable drive mechanism such as a motor 60, pulleys 62, 64 and a belt 66. The main floor 38 is further provided with upturned flanges 68 for blocking the ends of cargo handling mechanism 24 in its retracted storage position, and hence preventing slidable movement of the cargo handling mechanism on support rails 18, 20. Also, in this retracted position, coupling means such as interlocks comprising valves V and a switch 70 or the like are provided in which the switch is opened by, for example, the lower end of side wall 22 and/or cargo handling mechanism 24 for disabling brakes 71 on wheels 73 of prime mover 10, enabling the engine of the prime mover and or unlocking the transmission of the prime mover for movement from its neutral position to a drive position. Accordingly, box car 16 may then be transported by prime mover 10 on the railway to any suitable loading or unloading station. When the box car 16 is moved to the proper position for loading and/or unloading cargo, motor 60 is energized for moving side wall 22 and cargo handling mechanism 24 by virtue of gear 58 and gear quadrant 56 to its extended operating position as seen in FIG. 3. In this position, the contacts of switch 70 are closed which through any suitable electrical circuitry, not shown, and the aforementioned coupling means enables or sets the brakes 71 on the prime mover 10, disables the engine of the prime mover and/or locks the transmission of the prime mover in its neutral position. Also in this extended operating position of side wall 22 and cargo handling mechanism 24, the support rails 18, 20 of prime mover are in alignment with support rails 26, 28 respectively of box car 16, and the cargo handling mechanism 24 is free to be slidably moved on the rails to any position along side wall 30 of box car 16 for loading and/or unloading cargo therefrom. When the loading and/or unloading has been completed, the cargo handling mechanism 24 is slidably returned to side wall 22 of prime mover 10, and motor 60 energized for returning side wall 22 and cargo handling mechanism 24 to its retracted storage position. The prime mover 10 is then in position to transport the box car to another loading and/or unloading station or to some other destination.

Figure 4:
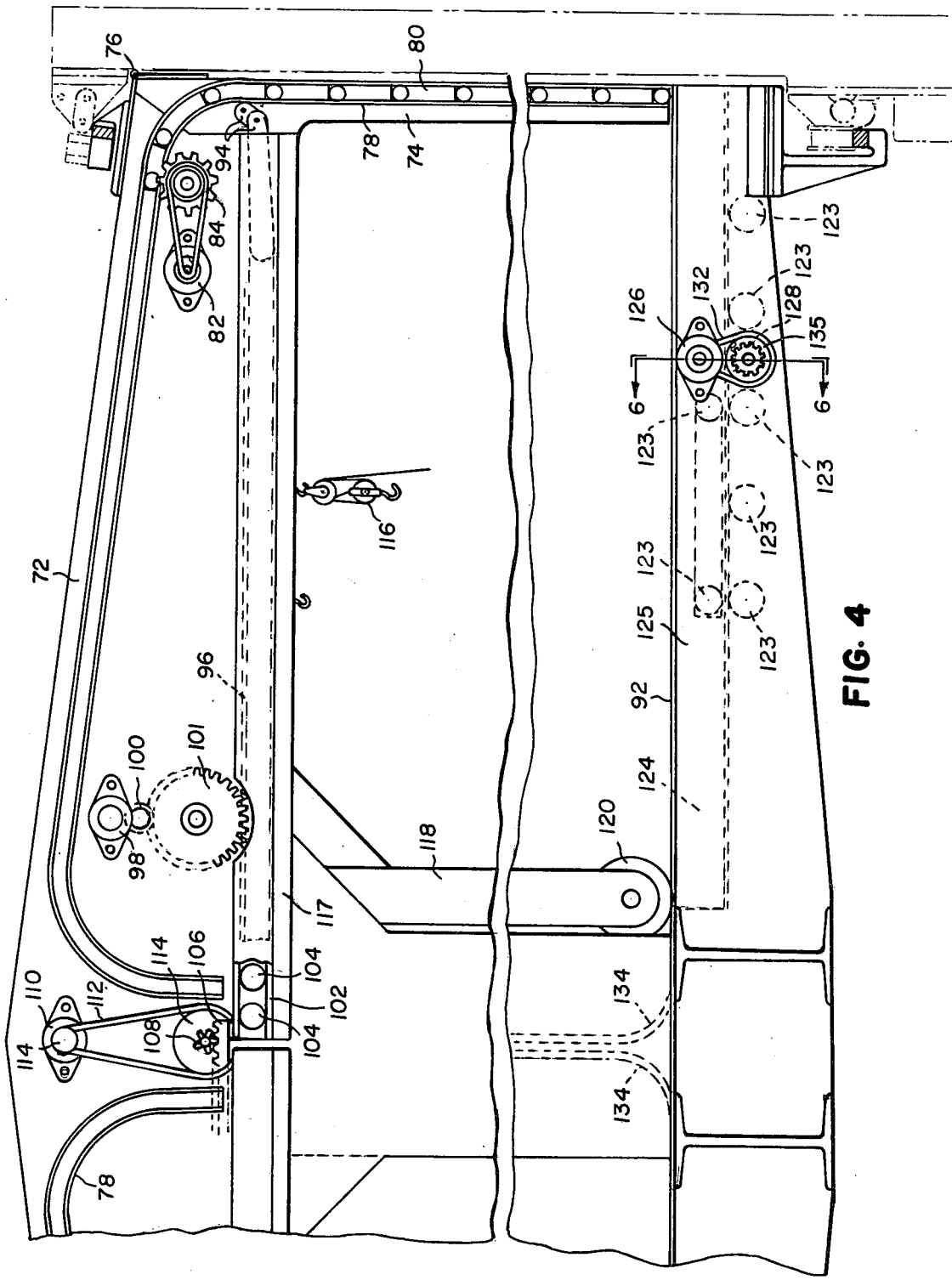
FIG. 4 is a section view taken substantially along line 4—4 of FIG. 1.
Figure 5:
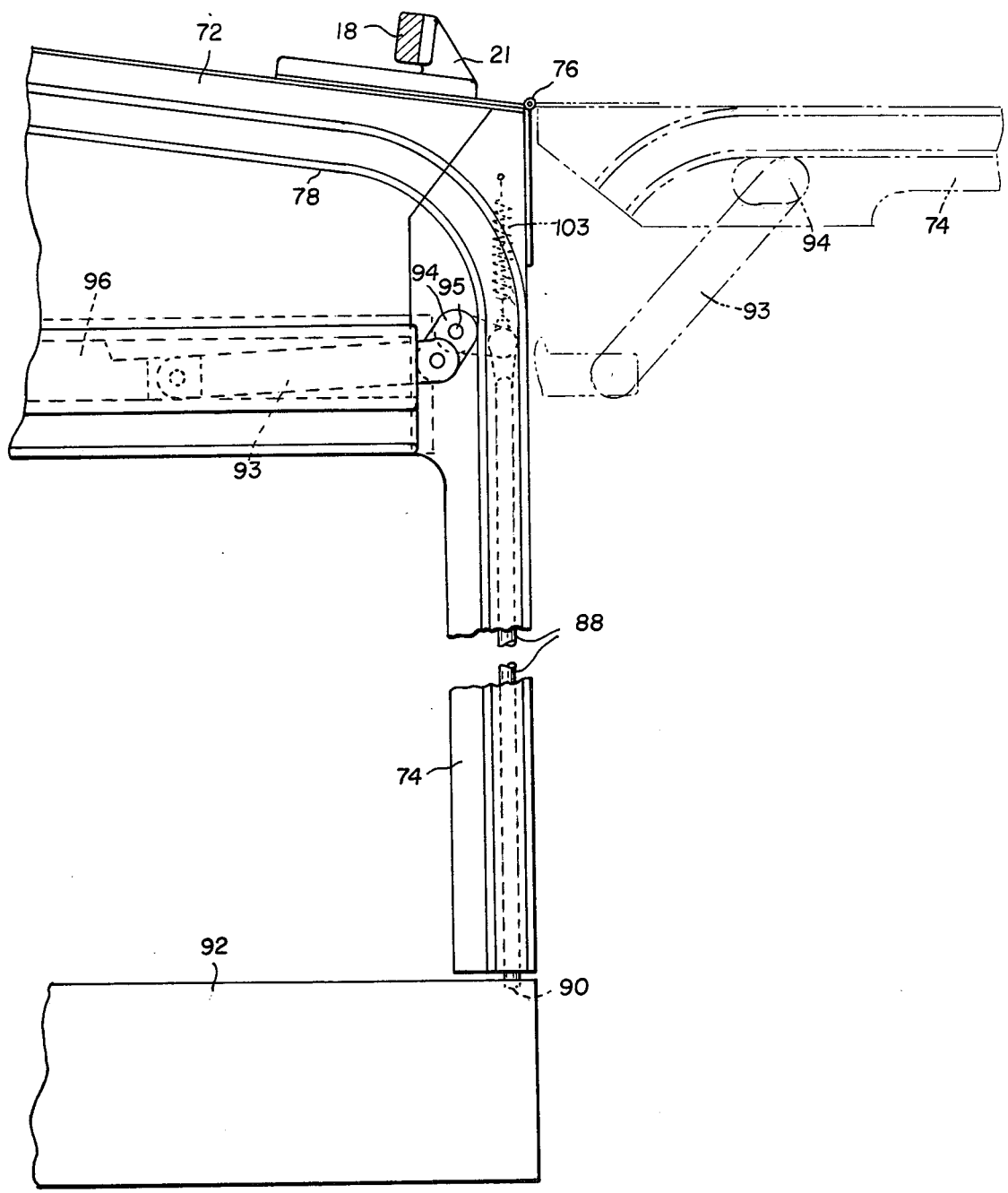
FIG. 5 is a section view taken substantially along line 5—5 of FIG. 1.

With reference to FIGS. 1, 4 and 5 an improved type of box car 16 for use with prime mover 10 of this invention is disclosed in which the car is divided lengthwise into bays with each bay separated by a bulkhead pedestal frame 72. The car side wall 30 is provided with a vertical post 74 hinged to the frame at 76. The post 74 and frame 72 are provided with guideways 78 for guiding hinged sliding doors 80 (FIG. 4) which are movable between open and closed positions by a motor 82 secured to frame 72 for driving a drive sprocket 84 into meshing engagement with complementary drive chain members, not shown, on doors 80. The post 74 is latched in its vertical position by a rod 88 (FIG. 5) supported for vertical movement by the post and having one end extending into a hole 90 in floor 92 of car 16, and its opposite end connected to a gear rack 96 by interlinking lever 93 and crank 94 (pivoted at 95). The gear rack 96 is driven by a motor 98 (FIG. 4) through gears 100, 101. Movement of gear rack 96 by motor 98 toward post 74 withdraws rod 88 from hole 90 and permits post 74 to be moved pivotally outwardly to its dotted position to provide freer access to the contents of box car 16. During pivotal movement of post 74, rod 88 is held in its retracted position by a spring 103.

The frame 72 (FIG. 4) further supports a beam 102 on rollers 104 interposed between the frame and beam. The beam 102 is provided with a gear rack 106 secured thereto by welding or the like and which is in meshing engagement with a drive gear 108 driven by a motor 110 through any suitable drive coupling such as a belt 112 and pulleys 114. Drive motor 110 reciprocally moves beam 102 on rollers 104 relative to box car 16 for moving cargo into or out of the car on hoists 116 carried by a depending flange 117 on beam 102. For further support, the beam 102 may be provided with a vertical post 118 having a roller 120 at the lower end riding on floor 92 of the car.

Figure 6:
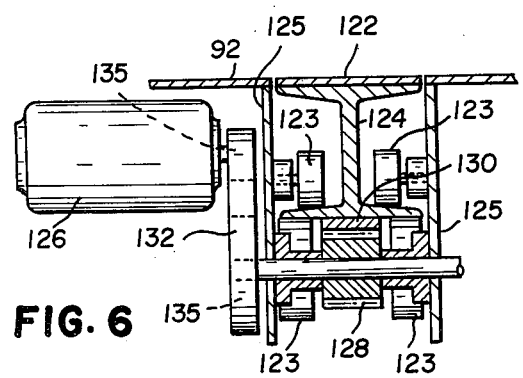
FIG. 6 is a section view taken substantially along line 6—6 of FIG. 4.

With reference to FIGS. 4 and 6, the box car is further provided with means for extending the floor 92 of the car. This is achieved by providing car floor 92 with spaced apart, parallel elongated floor members 122 (FIG. 6) secured to beams 124, only one of which is shown, and which is movable laterally by a drive motor 126. Beam 124 is supported by upper and lower rollers 123 supported by frame members 125. The motor is coupled to beam 124 by a drive gear 128 in meshing engagement with gear rack 130 on beam 124. The motor 126 drives gear 128 through any suitable drive mechanism such as belt 132 and pulleys 135. Secured to the rear end of each movable floor member 122 is the leading end of a flexible plate 134 for closing off the opening formed by the outwardly moving floor member. The trailing ends of the flexible plates 134 may be wound on suitable reels or supported and guided by suitable guideways, not shown, provided by box car frame 72.

The invention has been described in detail with particular reference to a preferred embodiment, but it will be understood that variations and modifications can be effected within the spirit and scope of the invention as described.

What is claimed:

1. A prime mover and box car combination for delivering cargo between cargo handling stations and for loading and unloading the cargo at the cargo handling stations comprising:

a prime mover for propelling a box car and having movable first support rails movable to an extended operating position, said prime mover adapted to be driven on a way between cargo handling stations;

a box car detachably secured to said prime mover for movement therewith and having second support rails in alignment with said first support rails and abutting said first support rails in said extended operating position; and a cargo handling mechanism carried by said first support rails of said prime mover and slidably mounted on said abutting first and second support support rails for movement between said extended operating position of said first support rails and cargo handling mechanism to a cargo handling position on said second support rails for loading and unloading cargo at the cargo handling stations.

2. The apparatus according to claim 1 wherein said first and second support rails are horizontally oriented and mounted adjacent corresponding sides of said prime mover and box car respectively.

3. The apparatus according to claim 1 wherein said first support rails are movable on said prime mover between said extended operating position in which said cargo handling mechanism is slidably movable on said first and second support rails, and a retracted storage position in which said cargo handling mechanism is prevented from slidably moving from said first support rails onto said second support rails, said first support rails comprise upper and lower horizontally oriented rails mounted on one side of said prime mover, said prime mover further having means for inwardly moving said one side of said prime mover and said cargo handling mechanism mounted thereon from said extended operating position to said retracted storage position.

4. The apparatus according to claim 3 wherein one end of said one side of said prime mover is pivotally mounted on a pivot adjacent said upper rail, said opposite end of said one side is movable laterally, and said moving means is drivingly coupled to said opposite end of said one side.

5. The apparatus according to claim 4 wherein said prime mover has a floor comprised of hinged floor members, said opposite end of said one side is connected to one of said hinged floor members, and said moving means comprises a gear quadrant secured to another one of said hinged floor members, and a drive gear for driving said gear quadrant.

6. The apparatus according to claim 3 wherein said prime mover is further provided with interlock means for preventing movement of said prime mover while said cargo handling mechanism is in said extended operating position.

7. An improved prime mover for use in conveying a box car between cargo handling stations for loading and unloading cargo comprising:
a prime mover frame having a movable support rail separate from a box car to be conveyed and movable to an extended operating position; and
a cargo handling mechanism carried by said support rail of said prime mover and slidably mounted and positioned on said support rail in said extended operating position, and movable from said extended operating position of said support rail to the box car for loading and unloading cargo therefrom.

8. The prime mover according to claim 7 wherein said support rail is horizontally oriented and mounted adjacent one side of said prime mover.

9. The prime mover according to claim 7 wherein said prime mover is provided with upper and lower horizontally oriented support rails mounted adjacent one side of said prime mover, said prime mover further having means for moving said one side of said prime mover and said cargo handling mechanism mounted thereon between said extended operating position in which said cargo handling mechanism is slidable on said support rails, and a retracted storage position in which said cargo handling mechanism is prevented from slidable movement on said support rails.

10. The prime mover according to claim 9 wherein one end of said one side of said prime mover is pivotally mounted on a pivot adjacent said upper rail, said opposite end of said one side is movable laterally, and said moving means is drivingly coupled to said opposite end of said one side.

11. The prime mover according to claim 10 wherein said prime mover has a floor comprised of hinged floor members, said opposite end of said one side is connected to one of said hinged floor members, and said moving means comprises a gear quadrant secured to another one of said hinged floor members, and a drive gear for driving said gear quadrant.

12. The apparatus according to claim 9 wherein said prime mover is further provided with interlock means for preventing movement of said prime mover while said cargo handling mechanism is in said extended exerating position.

* * * * *